US011636473B2

(12) United States Patent
Hashimoto et al.

(10) Patent No.: US 11,636,473 B2
(45) Date of Patent: Apr. 25, 2023

(54) ALTERING ACCOUNT NUMBERS INTO INVALID ACCOUNT NUMBERS FOR SECURE TRANSMISSION AND STORAGE

(71) Applicant: INTERNATIONAL BUSINESS MACHINES CORPORATION, Armonk, NY (US)

(72) Inventors: Kensuke Hashimoto, Tokyo (JP); Kenji Yamashita, Kitakyushu (JP); Masaya Yamada, Tokyo (JP); Hideki Shibata, Tokyo (JP); Kohji Horii, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 16/184,049

(22) Filed: Nov. 8, 2018

(65) Prior Publication Data

US 2020/0151711 A1    May 14, 2020

(51) Int. Cl.
*G06Q 20/38* (2012.01)
*G06Q 20/34* (2012.01)

(52) U.S. Cl.
CPC .......... *G06Q 20/385* (2013.01); *G06Q 20/34* (2013.01); *G06Q 2220/00* (2013.01)

(58) Field of Classification Search
CPC .... G06Q 20/038; G06Q 20/38; G06Q 20/385; G06Q 20/34; G06Q 2220/00; G06Q 20/227; G06Q 20/22
See application file for complete search history.

(56) References Cited

U.S. PATENT DOCUMENTS

| 7,853,529 | B1* | 12/2010 | Walker .................. G06Q 20/04 705/55 |
| 8,458,487 | B1 | 6/2013 | Palgon et al. |
| 8,935,802 | B1 | 1/2015 | Mattsson et al. |
| 9,430,652 | B1 | 8/2016 | Mattsson et al. |
| 2003/0084428 | A1* | 5/2003 | Agostini ............... G06Q 40/04 717/115 |

(Continued)

FOREIGN PATENT DOCUMENTS

| WO | WO-2017000061 A1 * | 1/2017 | ............ G06Q 20/02 |
| WO | WO-2018141047 A1 * | 8/2018 | ............ G06Q 20/00 |

OTHER PUBLICATIONS

EMV Payment Tokenisation Specification, Technical Framework, Version 1.0, Mar. 2014 (Year: 2014).*
EMV® Payment Tokenisation Specification (Year: 2014).*

*Primary Examiner* — Scott C Anderson
*Assistant Examiner* — James H Miller
(74) *Attorney, Agent, or Firm* — Rakesh Roy; Andrew D. Wright; Calderon Safran & Cole, P.C.

(57) ABSTRACT

A computer-implemented method includes: obtaining, by a computing device, an original Personal Account Number (PAN) to be transformed; transforming, by the computing device, the original PAN to form a transformed PAN; performing, by the computing device, a verification on the transformed PAN; determining, by the computing device, whether the transformed PAN passes verification; and storing or outputting, by the computing device, the transformed PAN based on determining that the transformed PAN does not pass verification, wherein the original PAN is later recovered from the transformed PAN to process a transaction.

18 Claims, 7 Drawing Sheets

(56) References Cited

U.S. PATENT DOCUMENTS

| | | | |
|---|---|---|---|
| 2008/0283590 A1* | 11/2008 | Oder, II | G06Q 20/401 |
| | | | 235/380 |
| 2012/0039469 A1* | 2/2012 | Mueller | G06Q 20/3823 |
| | | | 380/252 |
| 2012/0324555 A1 | 12/2012 | Chambers et al. | |
| 2015/0178693 A1* | 6/2015 | Solis | G06Q 20/227 |
| | | | 705/40 |
| 2017/0186002 A1 | 6/2017 | Oder, II et al. | |
| 2018/0032497 A1* | 2/2018 | Mukherjee | G06F 40/253 |
| 2018/0247483 A1* | 8/2018 | Lindsay | G07F 7/1008 |
| 2018/0293573 A1* | 10/2018 | Ortiz | G06Q 20/382 |
| 2019/0197616 A1* | 6/2019 | Dogin | G06Q 20/10 |
| 2019/0236562 A1* | 8/2019 | Padmanabhan | H04L 63/00 |
| 2019/0286841 A1* | 9/2019 | Staub | G06Q 20/3825 |
| 2019/0385126 A1* | 12/2019 | Morrow | G06Q 40/08 |
| 2020/0074434 A1* | 3/2020 | Chen | G06Q 40/03 |
| 2020/0074562 A1* | 3/2020 | Johnson | G06F 16/23 |

\* cited by examiner

ALTERING ACCOUNT NUMBERS INTO INVALID ACCOUNT NUMBERS FOR SECURE TRANSMISSION AND STORAGE

BACKGROUND

The present invention generally relates to altering account numbers and, more particularly, to altering account numbers into invalid account numbers for secure transmission and storage.

Application of the Payment Card Industry Data Security Standard (PCI DSS), an international standard for protecting credit card information, is useful for a company that handles credit card information.

Personal account numbers (PANs) include credit card numbers, bank account numbers, brokerage account numbers, financial account numbers, customer account numbers, or the like. PANs can be provided to a merchant to authorize the merchant to charge an account associated with the PAN as part of a transaction. When a merchant receives a PAN (e.g., through a point of sale terminal, e-commerce system, or the like), the PAN is verified to be valid using a validity checking technique (e.g., the Luhn check or other validity checking technique). As an example, if a user enters in a PAN (e.g., in the form of a credit card number) to pay for an online purchase on an e-commerce system and if the credit card number is mistyped, the e-commerce system will perform a validity check on the credit card number and the user will receive an error that the credit card number is invalid. This notifies the user to re-check and re-enter the correct credit card number to complete the transaction.

SUMMARY

In an aspect of the invention, a computer-implemented method includes: obtaining, by a computing device, an original Personal Account Number (PAN) to be transformed; transforming, by the computing device, the original PAN to form a transformed PAN; performing, by the computing device, a verification on the transformed PAN; determining, by the computing device, whether the transformed PAN passes verification; and storing or outputting, by the computing device, the transformed PAN based on determining that the transformed PAN does not pass verification, wherein the original PAN is later recovered from the transformed PAN to process a transaction.

In an aspect of the invention, there is a computer program product comprising a computer readable storage medium having program instructions embodied therewith. The program instructions executable by a computing device to cause the computing device to: obtain an original Personal Account Number (PAN) to be transformed; transform the original PAN to form a transformed PAN, wherein the transforming comprises: converting characters in a first portion of the original PAN in accordance with a conversion rule, and tokenizing characters in a second portion of the original PAN; perform a verification on the transformed PAN; determine whether the transformed PAN passes verification; re-transform the PAN based on determining that the transformed PAN passes verification; and store or output the re-transformed PAN, wherein the original PAN is later recovered from the re-transformed PAN to process a transaction.

In an aspect of the invention, a system includes: a processor, a computer readable memory and a computer readable storage medium associated with a computing device; program instructions to receive a transformed PAN; program instructions to divide the transformed PAN into a first portion and a second portion based on a conversion rule; restore the first portion based on inversely applying the conversion rule; de-tokenize the second portion based on an inverted de-tokenization function; concatenate the restored first portion and the de-tokenized second portion to form a recovered PAN; and process a transaction using the recovered PAN. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
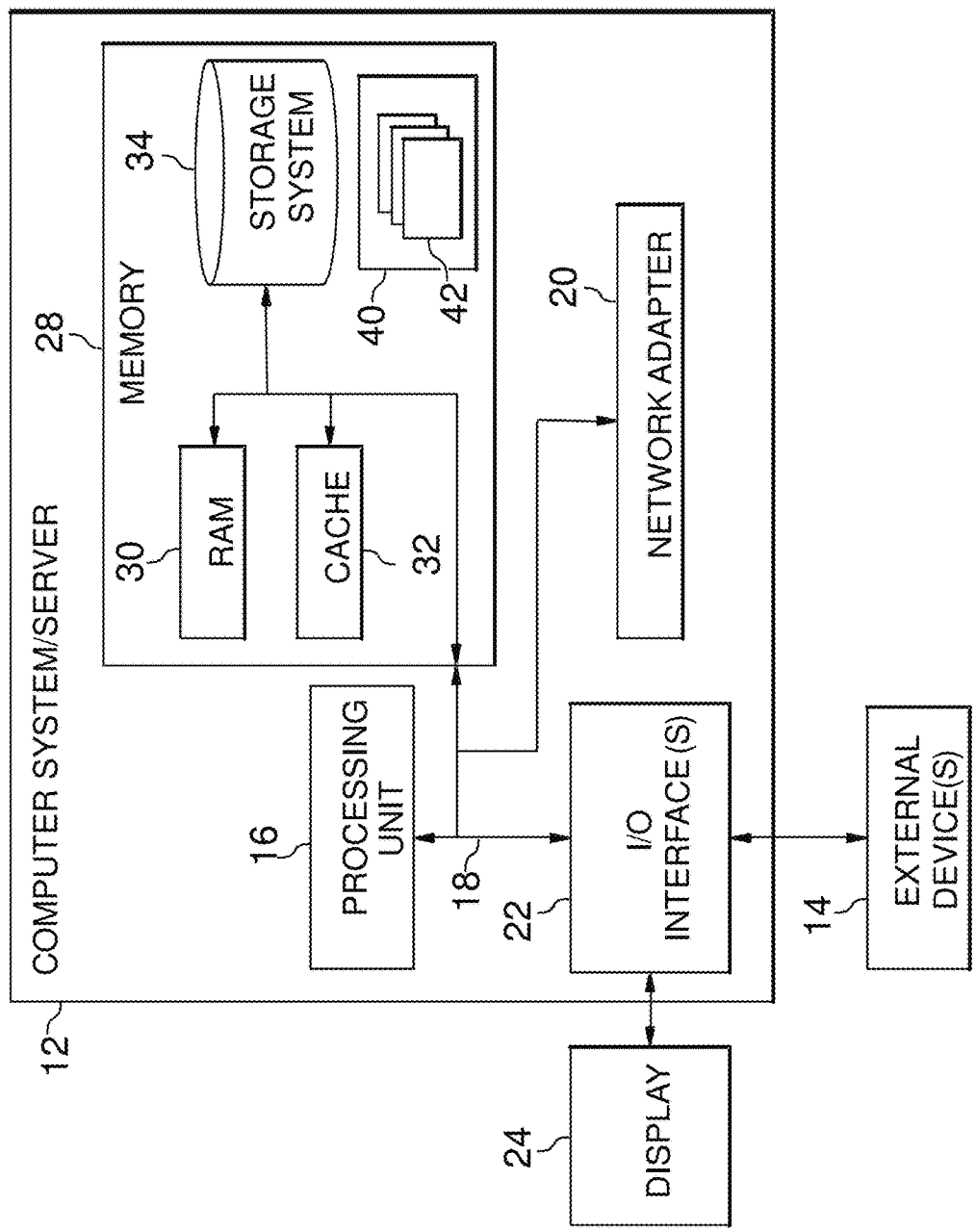
FIG. 1 shows an illustrative environment for managing the processes in accordance with aspects of the invention.

The present invention generally relates to altering personal account numbers (PANs) and, more particularly, to altering account numbers into invalid account numbers for secure transmission and storage. Aspects of the present invention alter or transform a PAN so that the PAN can be hidden, stored, and/or transmitted securely. As such, the actual PAN is not exposed to interception or unauthorized access. Further, aspects of the present invention transform the PAN into an invalid PAN so that if the transformed PAN is accessed by an unauthorized party, the transformed PAN will be invalid and unusable to complete a fraudulent transaction.

As described herein, aspects of the present invention transform a first portion of a PAN in accordance with a conversion rule and transform a second portion of the PAN using a tokenization technique. Aspects of the present invention concatenate the first and second transformed portions to form a transformed PAN that has a series of characters that are different than the actual or original PAN. Thus, the original PAN is hidden and undetectable by an unauthorized party. Further, aspects of the present invention verify that the transformed PAN is not a valid PAN and thus cannot be used by an unauthorized party. If the transformed PAN is valid, aspects of the present invention perform an additional conversion on the first portion of the transformed PAN to cause the transformed PAN to become invalid (e.g., by changing a single digit in the first portion such that the transformed PAN becomes invalid). In this way, if a transformed PAN is compromised and/or accessed by an unauthorized party, the transformed PAN will not be valid and cannot be used for charging or completing a fraudulent transaction. That is, aspects of the present invention not only transform a PAN, but do it in a way that the transformed PAN is not that of a valid PAN that could be used by an unauthorized party.

Aspects of the present invention provide a particular solution to the problem of bank fraud by transforming PANs using conversion rules and tokenization techniques. Further, aspects of the present invention improve the functioning of payment and financial processing computer systems by implementing functions in the computer systems that were not previously possible. In embodiments, aspects of the present invention include a computer system that performs unconventional steps, including generating new information that does not already exist, and subsequently, using the newly generated information in additional processes for storage, transmission, and PAN recovery.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computing node and is not intended to suggest any limitation as to the scope of use or functionality of embodiments of the invention described herein. Regardless, computer infrastructure 10 is capable of being implemented and/or performing any of the functionality set forth hereinabove In computer infrastructure 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer infrastructure 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2A:
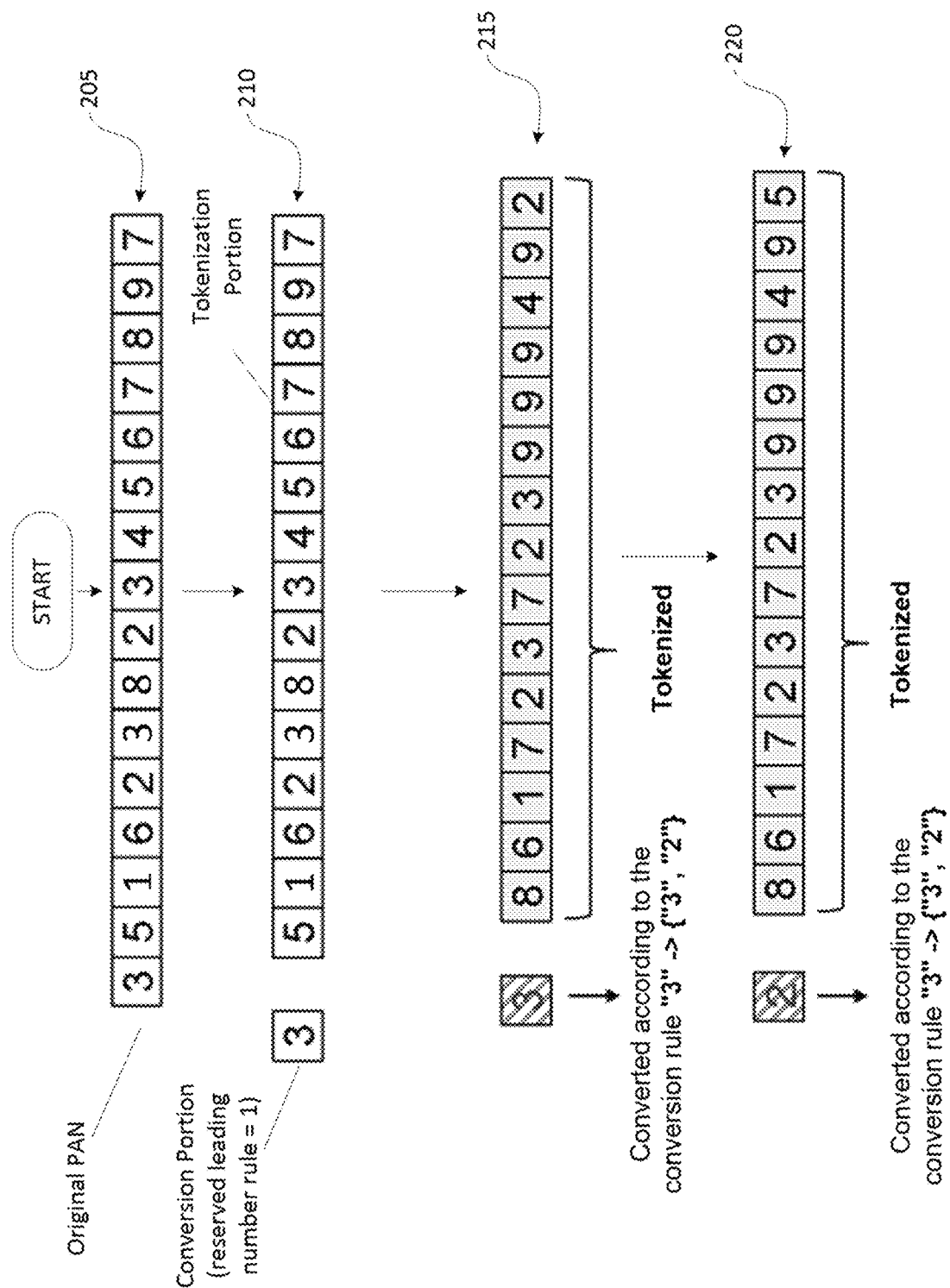
FIGS. 2A and 2B shows an overview of an example implementation in accordance with aspects of the present invention.
Figure 2B:
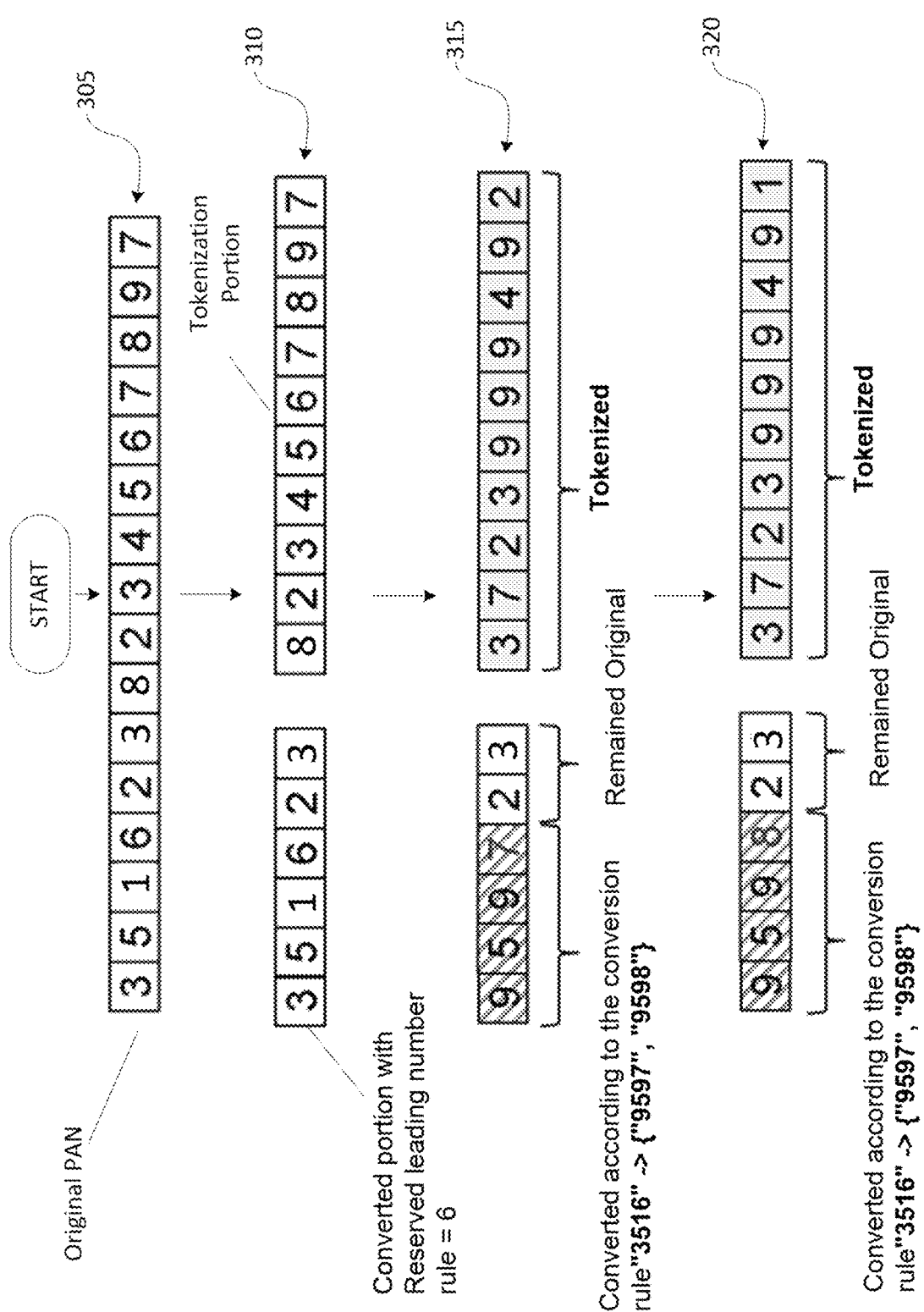

FIGS. 2A and 2B show an overview of an example implementation in accordance with aspects of the present invention. As shown in FIG. 2A, a PAN in the form of a 16-digit credit card number is transformed to an invalid credit card number (e.g., so that the original credit card number is hidden and the transformed credit card number is invalid and cannot be used by an authorized party to complete a fraudulent transaction). For example, step 205 shows the original credit card number. At step 210, the credit card number is separated into two portions according to a conversion rule. For example, the credit card number is separated into a first portion (e.g., the first leading digit) and a second portion (the subsequent 15 digits). As described herein, the first portion is a conversion portion and the second portion is a tokenization portion. In embodiments, the conversion rule includes a reserved leading number rule that identifies the number of leading digits to include in the first portion with the remaining digits being included in the second portion.

At step 215, the number in the first portion is converted in accordance with a conversion rule. In embodiments, the conversion rule includes two rounds of conversion statements to convert the first portion of the PAN. As described herein, the first portion may be converted once or twice as needed as is described in further detail herein. In embodiments, the conversion rule includes an "if/then" statement, such as "if the number is A, then convert first into B first, then to C" or "if the number is A, then first retain the number as A, then convert to B." The second portion (e.g., the tokenization portion) is tokenized using a tokenization algorithm (e.g., Format Perservering Encryption (FPE) and/or other tokenization algorithm).

In the example shown, the conversion rule states that if the number is "3" first retain the number "3." The first portion (after applying the first round of the conversion rule) and the second portion (after tokenization) are then concatenated to form a transformed PAN. The transformed PAN is checked against a validity check to ensure that the transformed PAN is invalid (e.g., such that a valid PAN is not created in the transformation of the original PAN). If, after step 215, the transformed PAN is invalid, the transformed PAN is output for secure storage or secure transmission. In this way, if the transformed PAN is accessed by an unauthorized party, the transformed PAN is unusable.

If, after step 215, the transformed PAN is valid, at step 220, the first portion is converted again in accordance to the second round of the conversion rule in order to invalidate the transformed PAN. In embodiments, only a single digit is changed from the transformed PAN, as changing a single digit will render a valid PAN invalid. In the example shown in FIG. 2A, the conversion rule states that if the number is "3" first retain the number "3," then convert to the number "2." Accordingly, the first portion is changed to "2" and the tokenization portion remains the same as in step 215. As such, the re-transformed PAN (at step 220) is invalid, as it includes the valid transformed PAN from step 215, but with a single digit changed, rending the PAN from step 215 invalid. The invalid re-transformed PAN (e.g., from step 220) is stored and/or transmitted. In order to recover the original PAN, the conversion rule and tokenization techniques are inversely applied. As such, the conversion rule and tokenization techniques are securely stored and not routinely or actively transmitted.

FIG. 2B shows another illustrative example of converting a PAN to an invalid PAN for secure storage and/or transmission. At step 305, an original PAN is shown. At step 310, the original PAN is divided into a first portion (e.g., a conversion portion) and a second portion (e.g., a tokenization portion). The conversion portion, in this example according to a predetermined conversion rules, includes the leading six digits, the first four of which are to be converted, and the final two are to remain original. At step 315, a transformed PAN is produced by converting the converted portion in accordance with the first round of the conversion rule, and the tokenizing the second portion. If at step 315, the transformed PAN is invalid, the transformed PAN is stored and/or transmitted. If at step 315, the transformed PAN is valid, a single digit from the conversion portion is changed in accordance with the conversion rule to render the previously valid transformed PAN from step 315 invalid. The re-transformed PAN from step 320 is then stored and/or transmitted.

The first portion is converted according to the conversion rule. As described herein, the conversion rule identifies two rounds of conversion of the first portion of the PAN. In the example shown the first round of conversion is to keep the number "3" as "3", and the second round of conversion is to convert the number "3" into "2." As described herein, the second round of conversion is performed when the transformed PAN is valid, thus, the second round of conversion changes one of the digits in the transformed PAN such that the transformed PAN is invalid.

Figure 3:
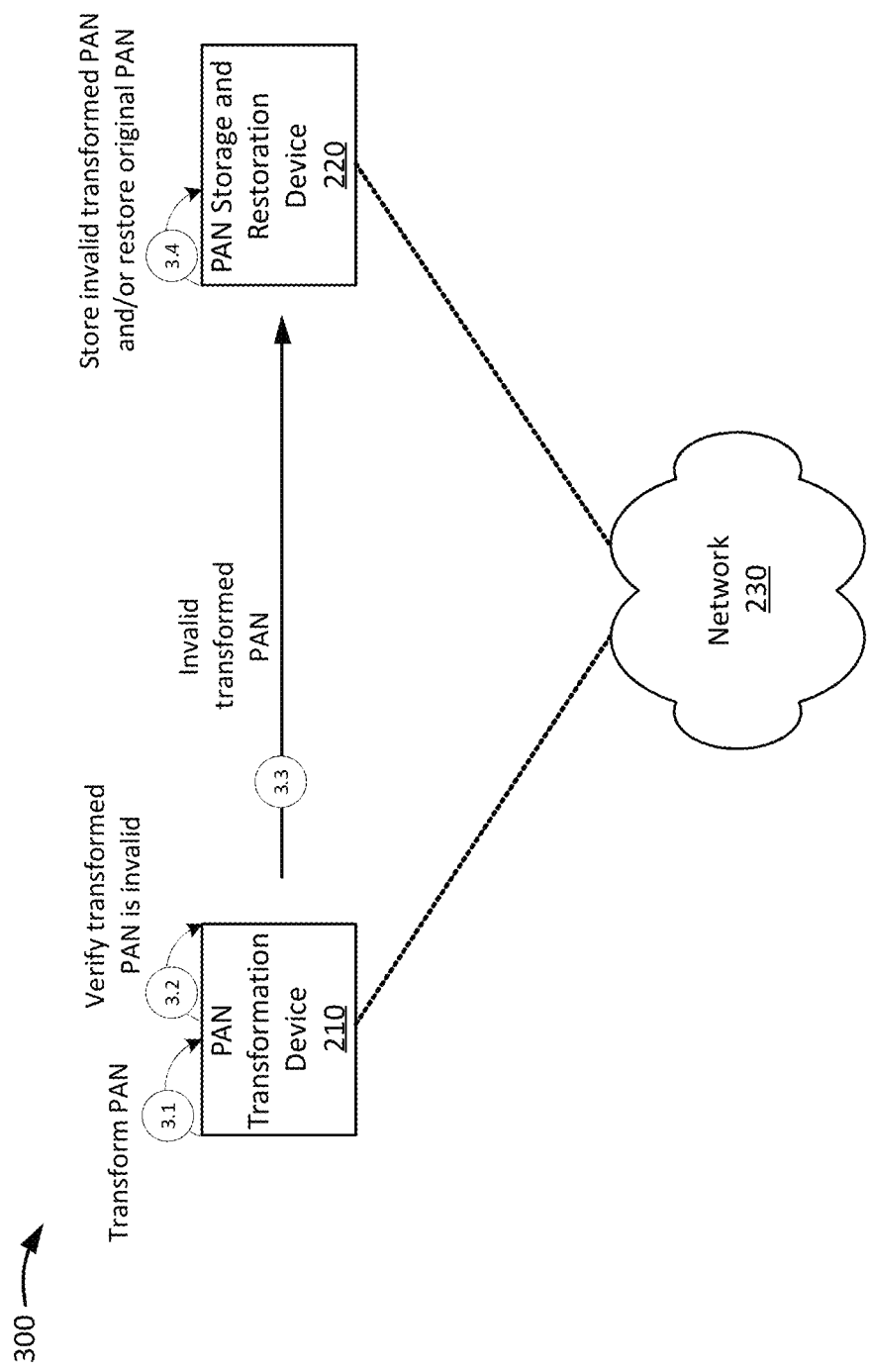
FIG. 3 shows an example environment in accordance with aspects of the present invention.

FIG. 3 shows an example environment in accordance with aspects of the present invention. As shown in FIG. 3, environment 300 includes a PAN transformation device 210, a PAN storage and restoration device 220, and a network 230. In embodiments, one or more components in environment 300 may include the components of computer system/server 12 of FIG. 1.

The PAN transformation device 210 includes one or more computing devices (e.g., such as computer system/server 12 of FIG. 1) that transforms a PAN for secure transmission and/or storage. In embodiments, the PAN transformation device 210 includes a payment system, a security server, a payment terminal, or the like. At step 3.1, the PAN transformation device 210 transforms the PAN in accordance with the processes described in FIGS. 2A and 2B. At step 3.2, the PAN transformation device 210 verifies that the transformed PAN is invalid, and if not, alters a single digit in the conversion portion to render the transformed PAN invalid. At step 3.3, the PAN transformation device 210 outputs the invalid transformed PAN.

The PAN storage and restoration device 220 includes one or more computing devices (e.g., such as computer system/server 12 of FIG. 1) that receives an invalid PAN for secure storage. In embodiments, the PAN storage and restoration device 220 includes a payment processing system associated with an original PAN associated with the transformed PAN. In embodiments, the PAN storage and restoration device 220 (e.g., at step 3.4) stores the invalid transformed PAN. Additionally, or alternatively, the PAN storage and restoration device 220 restores the original PAN (e.g., for processing a transaction associated with the original PAN) by inversely applying the conversion rule and tokenization technique used to generate the invalid transformed PAN.

The network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300. Additionally, or alternatively, in embodiments, the devices of the environment 300 are integrated together. For example, in an example embodiment, operations of the PAN transformation device 210 and the PAN storage and restoration device 220 are performed by a single device. Devices of the environment 300 may interconnect via wired connections, wireless connections, or a combination of wired and wireless connections.

Figure 4A:
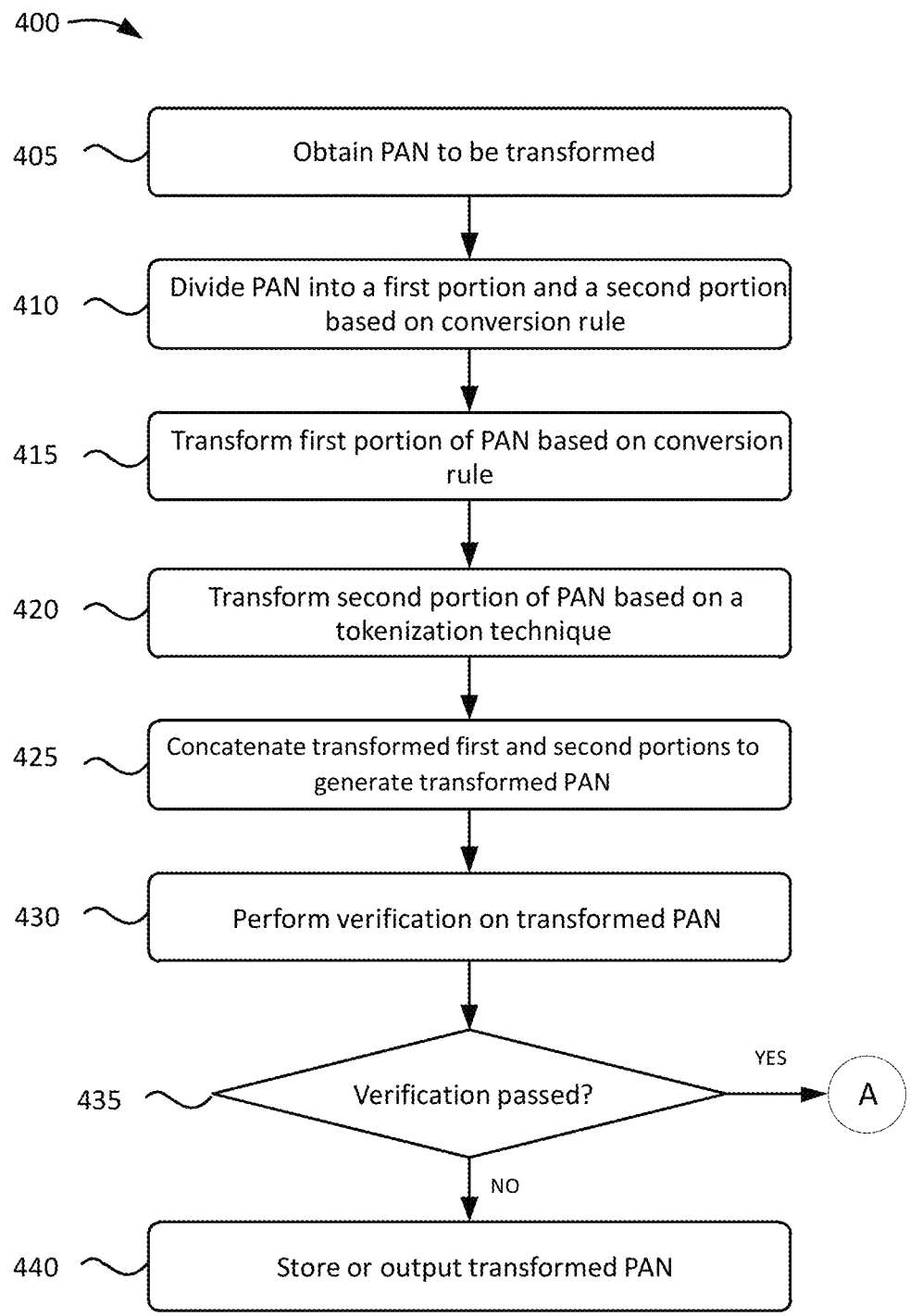
FIGS. 4A and 4B show an example flowchart of a process for transforming a PAN into an invalid PAN for secure transmission and storage in accordance with aspects of the present invention.
Figure 4B:
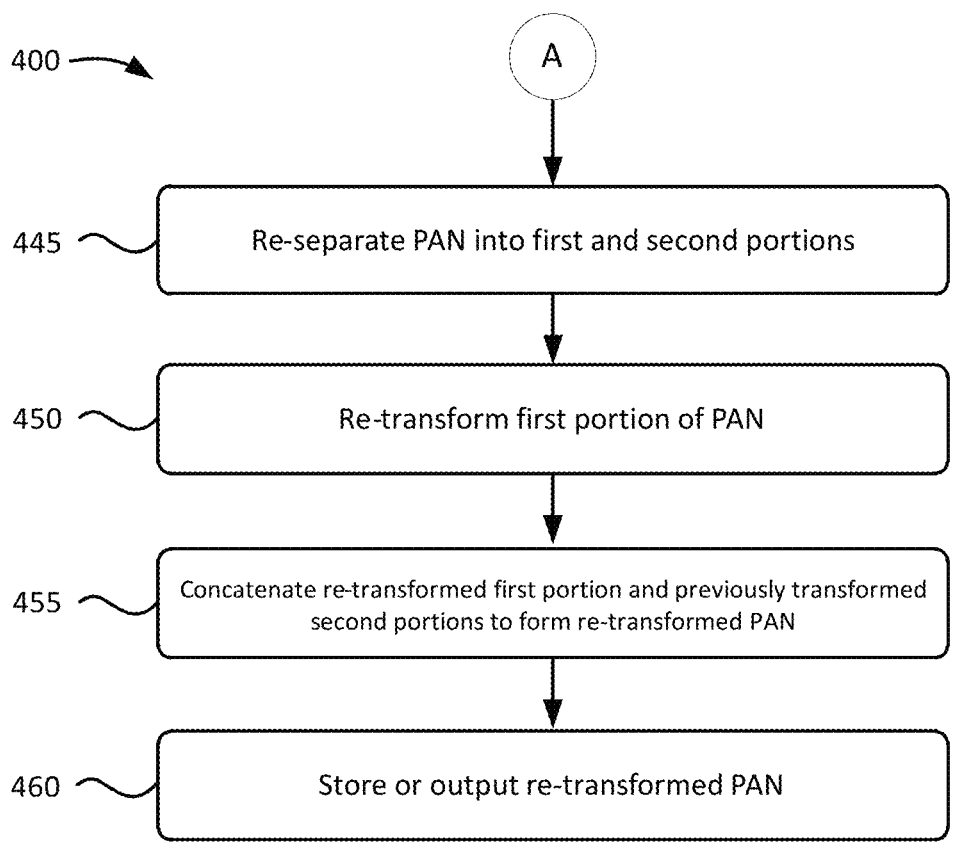

FIGS. 4A and 4B show an example flowchart of a process for transforming a PAN into an invalid PAN for secure transmission and storage. The steps of FIGS. 4A and 4B may be implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

As shown in FIG. 4A, process 400 includes obtaining a PAN to be transformed (step 405). For example, the PAN transformation device 210 obtains a PAN to be transformed. In an example embodiment, the PAN transformation device 210 obtains the PAN from a user or authorized party of the PAN as part of a service request (e.g., a cloud service) to securely store and/or transmit the PAN. In embodiments, the service request is part of a secure transaction processing service request. In embodiments, the PAN is obtained via entry of the PAN by the user into an online or e-commerce system, swiping/insertion of a credit card in a point-of-sale terminal, etc. As another example, the PAN is stored by a bank or provider of the PAN and the service request includes a request by the bank or provider to transform the PAN such that original PANs are not stored.

Process 400 also includes dividing the PAN into a first portion and a second portion based on a conversion rule (step 410). For example, the PAN transformation device 210 divides the PAN into a first portion (e.g., a conversion portion) and a second portion (e.g., a tokenization portion) based on a preconfigured conversion rule (e.g., in a similar as described above at steps 210 and 310). In embodiments, the conversion rule includes a rule that the value of a conversion result is not a subsequence starting from the beginning of the value of any other conversion result. In embodiments, multiple of conversion rules are defined. The conversion process sequentially checks whether there is match between values in the order from the conversion rule with longest digits to the conversion rule with shortest digits. In embodiments, the conversion rule is preconfigured and takes into consideration any applicable standards (e.g., the PCI DSS standards). In embodiments, the first portion includes a series of leading digits that identifies the source of the PAN.

Process 400 further includes transforming the first portion of the PAN based on the conversion rule (step 415). For example, the PAN transformation device 210 transforms the first portion of the PAN based on the conversion rule (e.g., in a similar manner as described above at steps 215 and 315).

Process 400 also includes transforming the second portion of the PAN based on a tokenization technique (step 420). For example, the PAN transformation device 210 transforms the second portion of the PAN based on a tokenization technique (e.g., in a similar manner as described above at steps 215 and 315).

Process 400 further includes concatenating the transformed first and second portions to generate transformed PAN (step 425). For example, the PAN transformation device 210 concatenates the transformed first portion (from step 415) and the transformed second portion (from step 420) to form the transformed PAN.

Process 400 also includes perform verification on the transformed PAN (step 430). For example, the PAN transformation device 210 performs a verification check on the transformed PAN (from step 425). As an example, the PAN transformation device 210 performs the Luhn check or other suitable validity check on the PAN.

Process 400 further includes determining whether the verification has passed (step 435). For example, the PAN transformation device 210 determines whether the verification has passed based on the results of the verification check (e.g., from step 430). If, at step 435, verification does not pass (step 435-NO), process 400 includes storing or outputting the transformed PAN. In this way, the original PAN is transformed and hidden, and the transformed PAN is invalid so that the transformed PAN cannot be used by an unauthorized party.

If, on the other hand, the verification passes (step 435—YES), process 400 includes re-separating the PAN into first and second portions (step 445 as shown in FIG. 4B). For example, the PAN transformation device 210 re-separates the PAN in to the same first and second portions as was done at step 415 and 420 (e.g., with the same number of leading digits for the first portion).

Process 400 also includes re-transforming the first portion of the PAN (step 450). For example, the PAN transformation device 210 re-transforms the first portion of the PAN to change a single digit in the first portion of the PAN per the conversion rule. The PAN transformation device 210 retains the previously transformed second or tokenized portion of the PAN.

Process 400 further includes concatenating the re-transformed first portion and the previously transformed second portion to form a re-transformed PAN (step 455). For example, the PAN transformation device 210 concatenates the re-transformed first portion and the previously transformed second portion. As the previously transformed PAN (e.g., from step 425) was valid, the re-transformed PAN will be invalid as a single digit from the previously transformed and valid PAN was changed.

Process 400 also includes storing or outputting the re-transformed PAN (step 460). For example, the PAN transformation device 210 stores our outputs the re-transformed PAN. As the re-transformed PAN is invalid, unauthorized parties will be unable to use the re-transformed PAN for unauthorized charges.

Figure 5:
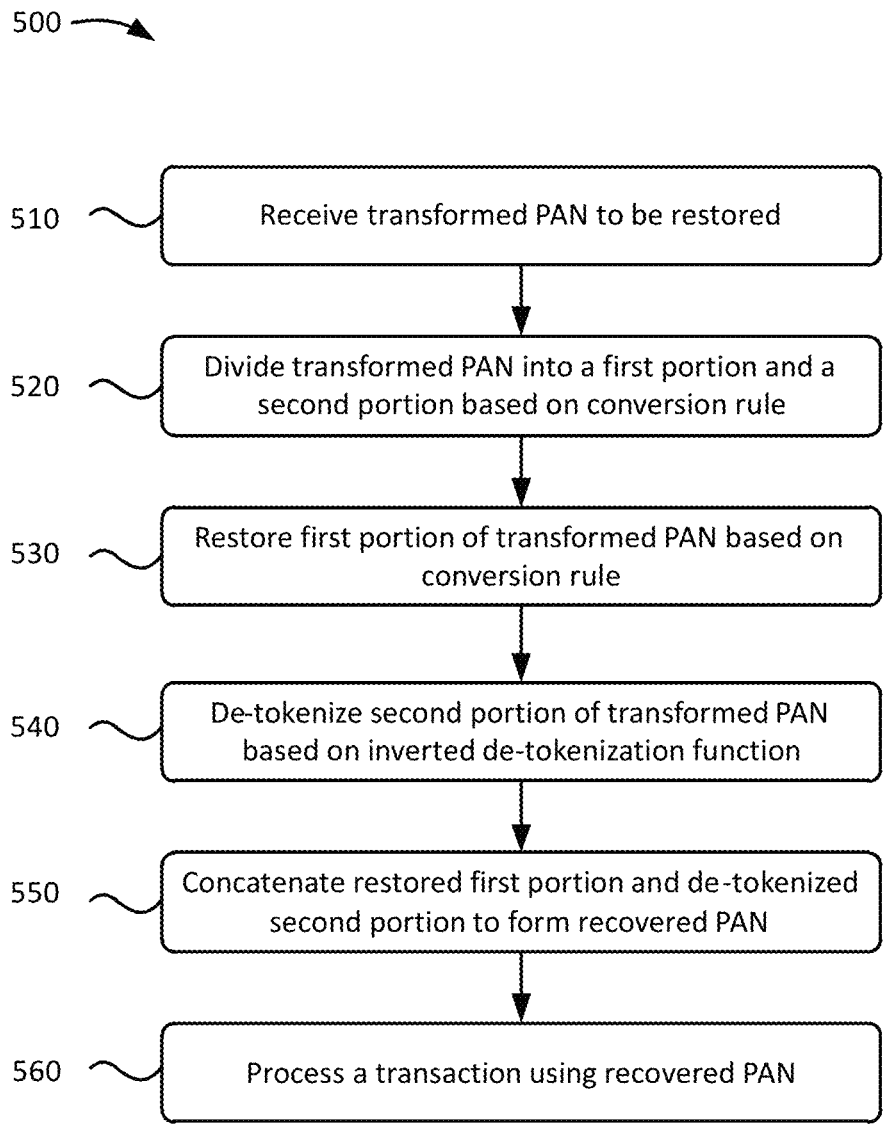
FIG. 5 shows an example flowchart of a recovering an original PAN from a transformed PAN for processing a transaction in accordance with aspects of the present invention.

FIG. 5 shows an example flowchart of a recovering an original PAN from a transformed PAN for processing a transaction. The steps of FIG. 5 may be implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

As shown in FIG. 5, process 500 includes receiving a transformed PAN to be restored (step 510). For example, the PAN storage and restoration device 220 receives a transformed PAN from the PAN transformation device 210. In embodiments, the PAN storage and restoration device 220 receives the transformed PAN as part of an instruction to process a transaction with an original PAN associated with the transformed PAN.

Process 500 also includes dividing the transformed PAN into a first portion and a second portion based on a conversion rule (step 520). For example, the PAN storage and restoration device 220 divides the transformed PAN into a first portion and a second portion based on a conversion rule that identifies the number of leading digits that correspond to the first portion (e.g., a conversion portion) and the second portion (e.g., a tokenization portion).

Process 500 further includes restoring the first portion of the transformed PAN based on the conversion rule (step 530). For example, the PAN storage and restoration device 220 restores the first portion of the transformed PAN by inversely applying the conversion rule to the first portion.

Process 500 also includes de-tokenizing the second portion of the transformed PAN based on an inverted de-tokenization function (step 540). For example, the PAN storage and restoration device 220 applies an inverted de-tokenization function (e.g., a tokenization function that is the inverse of the tokenization function used to tokenize the PAN).

Process 500 further includes concatenating the restored first portion and the de-tokenized second portion to form the recovered PAN (step 550). For example, the PAN storage and restoration device 220 concatenates the restored first portion (from step 530) and the de-tokenized second portion (from step 540) to form a recovered PAN. As described herein, the recovered PAN is the original PAN prior to being transformed.

Process 500 also includes processing a transaction using the recovered PAN (step 560). For example, the PAN storage and restoration device 220 processes a transaction using the recovered or original PAN (e.g., outputted at step 550).

In embodiments, aspects of the present invention include computer-implemented method for tokenizing data including: receiving, by a computing device, data to be tokenized; dividing the data into two blocks, the first block identifying sources of the data; retrieving one or more conversion rules; generating tokenized data based on the received data by: converting the first block to a first value of the one or more conversion rules, and the second block tokenizes according to Format Preserving Encryption (FPE); concatenating the two blocks to create the tokenized data; determining if the tokenized data passes the validation check; and responsive to the tokenized data passing the validation check, modifying first half of the tokenized data to second value of the one or more conversion rules such that the modified tokenized data does not pass the validation check.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a computing device, an original Personal Account Number (PAN) to be transformed;
   dividing, by the computing device, the original PAN into a first portion and a second portion;
   generating, by the computing device, a converted portion by performing a conversion rule on the first portion of the original PAN;
   generating, by the computing device, a tokenized portion by performing a tokenization technique on the second portion of the original PAN;
   generating, by the computing device, a transformed PAN by concatenating the converted portion and the tokenized portion, the transformed PAN is an unverified PAN that has not been verified as an invalid PAN or a valid PAN, wherein the invalid PAN is used to process a transaction and the valid PAN is re-transformed to change the transformed PAN into the invalid PAN;
   performing, by the computing device, a verification check on the transformed PAN to check whether the transformed PAN that is the unverified PAN is the invalid PAN;
   determining, by the computing device, whether the transformed PAN is the valid PAN as a result of the verification check and finding the transformed PAN passed the verification check and was found to be the valid PAN;
   generating, by the computing device and as a result of the verification check verifying that the transformed PAN is the valid PAN, a re-converted portion, the reconverted portion being generated by changing only a single digit of the converted portion;
   generating, by the computing device, a re-transformed PAN by concatenating the re-converted portion and the tokenized portion, the re-transformed PAN being the invalid PAN as a result of the changing only the single digit of the converted portion; and
   storing or outputting, by the computing device, the re-transformed PAN,
   wherein the computing device performs the generating the re-transformed PAN before performing the storing or outputting, and
   the original PAN is later recovered from the re-transformed PAN that is the invalid PAN to process the transaction.

2. The computer-implemented method of claim 1, wherein the conversion rule comprises an "if/then" statement with a first and a second round of conversion, wherein the second round of the conversion includes the first portion being reconverted.

3. The computer-implemented method of claim 1, wherein the tokenization technique comprises Format Persevering Encryption (FPE).

4. The computer-implemented method of claim 1, wherein the performing the verification check comprises performing a Luhn check on the transformed PAN.

5. The computer-implemented method of claim 1, wherein a service provider performs at least one selected from the group consisting of: creates the computing device, maintains the computing device, deploys the computing device, and supports the computing device.

6. The computer-implemented method of claim 1, wherein the obtaining the original PAN, the dividing the original PAN, the generating the converted portion, the generating the tokenized portion, the generating the transformed PAN, the performing the verification check, the determining whether the transformed PAN is a valid PAN, the generating the re-converted portion, the generating the re-transformed PAN, and the storing or outputting the re-transformed PAN are provided by a service provider on a subscription, advertising, and/or fee basis.

7. The computer-implemented method of claim 1, wherein the computing device includes software provided as a service in a cloud environment.

8. The computer-implemented method of claim 1, further comprising deploying a system, wherein the deploying the system comprises providing a computer infrastructure operable to perform the obtaining the original PAN, the dividing the original PAN, the generating the converted portion, the generating the tokenized portion, the generating the transformed PAN, the performing the verification check, the determining whether the transformed PAN is a valid PAN, the generating the re-converted portion, the generating the re-transformed PAN, and the storing or outputting the re-transformed PAN.

9. A computer program product comprising a computer readable storage medium having program instructions embodied therewith, the program instructions executable by a computing device to cause the computing device to:
 obtain an original Personal Account Number (PAN) to be transformed;
 generate a converted portion by converting characters in a first portion of the original PAN in accordance with a conversion rule;
 generate a tokenized portion by tokenizing characters in a second portion of the original PAN;
 generate a transformed PAN by concatenating the converted portion and the tokenized portion, the transformed PAN is an unverified PAN that has not been verified as an invalid PAN or a valid PAN, wherein the invalid PAN is used to process a transaction and the valid PAN is re-transformed to change the transformed PAN into the invalid PAN;
 perform a verification check on the transformed PAN to check whether the transformed PAN is the invalid PAN;
 determine whether the transformed PAN is the valid PAN as a result of the verification check and finding the transformed PAN passed the verification check and was found to be the valid PAN;
 generate, as a result of the verification check verifying the transformed PAN is the valid PAN, a re-converted portion, the reconverted portion being generated by changing only a single digit of the converted portion;
 generate a re-transformed PAN by concatenating the re-converted portion and the tokenized portion, the re-transformed PAN being the invalid PAN as a result of the changing only the single digit of the converted portion; and
 store or output the re-transformed PAN,
 wherein the program instructions generate the re-transformed PAN before the storing or outputting, and
 the original PAN is later recovered from the re-transformed PAN that is the invalid PAN to process the transaction.

10. The computer program product of claim 9, wherein the program instructions further cause the processor to, based on determining that the transformed PAN is not a valid PAN, refrain from re-transforming the PAN, and store or output the transformed PAN, wherein the original PAN is later recovered from the transformed PAN to process a transaction.

11. The computer program product of claim 9, wherein the generating the tokenized portion comprises Format Persevering Encryption (FPE).

12. A system comprising:
 a processor, a computer readable memory and a computer readable storage medium associated with a computing device;
 program instructions to obtain an original Personal Account Number (PAN) to be transformed;
 program instructions to generate a converted portion by converting characters in a first portion of the original PAN in accordance with a conversion rule;
 program instructions to generate a tokenized portion by tokenizing characters in a second portion of the original PAN;
 program instructions to generate a transformed PAN by concatenating the converted portion and the tokenized portion, the transformed PAN is an unverified PAN that has not been verified as an invalid PAN or a valid PAN, wherein the invalid PAN is used to process a transaction and the valid PAN is re-transformed to change the transformed PAN into the invalid PAN;
 program instructions to perform a verification check on the transformed PAN to check whether the transformed PAN is the invalid PAN;
 program instructions to determine whether the transformed PAN is the valid PAN as a result of the verification check and finding the transformed PAN passed the verification check and was found to be the valid PAN;
 program instructions to generate, as a result of the verification check verifying that the transformed PAN is the valid PAN, a re-converted portion, the reconverted portion being generated by changing only a single digit of the converted portion;
 program instructions to generate a re-transformed PAN by concatenating the re-converted portion and the tokenized portion, the re-transformed PAN being the invalid PAN as a result of the changing only the single digit of the converted portion; and
 program instructions to store or output the re-transformed PAN,
 wherein the program instructions generate the re-transformed PAN before the storing or outputting,
 the original PAN is later recovered from the re-transformed PAN that is the invalid PAN to process the transaction, and
 wherein the program instructions are stored on the computer readable storage medium for execution by the processor via the computer readable memory.

13. The computer-implemented method of claim 1, wherein the conversion rule performs the dividing the transformed PAN by identifying the number of leading digits that correspond to the first portion and the second portion.

14. The computer-implemented method of claim 1, wherein the conversion rule comprises a reserved leading number rule that identifies a number of leading digits of the original PAN to be the first portion, and identifies a remaining number of digits of the original PAN to be the second portion.

15. The computer-implemented method of claim 1, wherein the PAN is a credit card number.

16. The computer-implemented method of claim 1, wherein the single digit of the converted portion is the first digit of the original PAN.

17. The computer-implemented method of claim 1, wherein the converted portion is generated by a first round of the conversion rule, and the re-converted portion is generated by a second round of the conversion rule.

18. The computer-implemented method of claim 1, further comprising transmitting, by the computing device, the re-transformed PAN over a wireless network.

\* \* \* \* \*